United States Patent
Keene et al.

(10) Patent No.: US 10,212,481 B2
(45) Date of Patent: *Feb. 19, 2019

(54) HOME MENU INTERFACE FOR DISPLAYING CONTENT VIEWING OPTIONS

(71) Applicant: Samsung Electronics Co., Ltd., Suwon-si, Gyeonggi-do (KR)

(72) Inventors: Maxel J. Keene, Ben Lomond, CA (US); Jonathan Gaiser, Sunnyvale, CA (US); Sophia Heeyoun Sung, San Jose, CA (US); Chris Turkstra, San Jose, CA (US); Margaret Smith, Brooklyn, NY (US); Avner Ronen, Chestnut Ridge, NY (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/153,259

(22) Filed: May 12, 2016

(65) Prior Publication Data
US 2017/0070786 A1    Mar. 9, 2017

Related U.S. Application Data

(60) Provisional application No. 62/214,435, filed on Sep. 4, 2015.

(51) Int. Cl.
*H04N 21/482* (2011.01)
*G06F 3/0482* (2013.01)
(Continued)

(52) U.S. Cl.
CPC ....... *H04N 21/4821* (2013.01); *G06F 3/0482* (2013.01); *G06F 3/0484* (2013.01);
(Continued)

(58) Field of Classification Search
None
See application file for complete search history.

(56) References Cited

U.S. PATENT DOCUMENTS 7,987,491 B2 * 7/2011 Reisman ........... G06F 17/30873
725/112
8,291,452 B1 * 10/2012 Yong ................. H04N 21/2743
715/719

(Continued)

OTHER PUBLICATIONS

Google, Search, Click on a still image to access a video remotely, Mar. 12, 2018 (Year: 2018).*

(Continued)

*Primary Examiner* — Hoang Vu A Nguyen Ba

(57) ABSTRACT

A method of displaying a home menu interface on a content viewing device, such as a television, is described. The interface is comprised of two components: a launcher and an accelerator. Each of these components include multiple tiles. One type of launcher tile represents a content source. The user can select this tile and enable a direct link to the content source application. Only after selecting the tile, does the content source application open. An accelerator is associated with a specific content source. An accelerator tile displays content previews or enables easy playback of content provided by the content source. The user can select an accelerator tile and enable a deep link to the content, taking the user straight to the content, bypassing a hierarchy of menu options.

16 Claims, 8 Drawing Sheets

(51) Int. Cl.
G06F 3/0484 (2013.01)
G06F 3/0488 (2013.01)
H04N 21/431 (2011.01)
H04N 21/436 (2011.01)
H04N 21/443 (2011.01)
H04N 21/462 (2011.01)
H04N 21/472 (2011.01)

(52) U.S. Cl.
CPC ..... *G06F 3/04883* (2013.01); *H04N 21/4314* (2013.01); *H04N 21/43615* (2013.01); *H04N 21/4433* (2013.01); *H04N 21/462* (2013.01); *H04N 21/47217* (2013.01)

(56) References Cited

U.S. PATENT DOCUMENTS

| | | | |
|---|---|---|---|
| 9,532,111 B1* | 12/2016 | Christie | H04N 21/4826 |
| 2002/0112237 A1* | 8/2002 | Kelts | G06F 3/0481 |
| | | | 725/39 |
| 2008/0178125 A1 | 7/2008 | Elsbree et al. | |
| 2011/0099519 A1* | 4/2011 | Ma | G06F 3/0482 |
| | | | 715/811 |
| 2011/0164038 A1 | 7/2011 | Jung et al. | |
| 2012/0173339 A1 | 7/2012 | Flynt et al. | |
| 2013/0174201 A1* | 7/2013 | Tam | H04N 21/4312 |
| | | | 725/40 |
| 2013/0247103 A1 | 9/2013 | White et al. | |
| 2013/0263031 A1 | 10/2013 | Oshiro et al. | |
| 2014/0059606 A1* | 2/2014 | Selim | H04N 5/44 |
| | | | 725/38 |
| 2014/0082474 A1 | 3/2014 | Nordback | |
| 2014/0130081 A1 | 5/2014 | Ozawa | |
| 2014/0237397 A1 | 8/2014 | Song et al. | |
| 2014/0351722 A1 | 11/2014 | Frederickson et al. | |
| 2015/0095819 A1 | 4/2015 | Hong et al. | |
| 2015/0128042 A1 | 5/2015 | Churchill et al. | |
| 2015/0143423 A1* | 5/2015 | Park | G06F 3/041 |
| | | | 725/40 |
| 2015/0193384 A1* | 7/2015 | Ragan | G06F 3/04817 |
| | | | 715/273 |
| 2016/0062668 A1* | 3/2016 | Park | G06F 3/04842 |
| | | | 715/771 |
| 2016/0191980 A1* | 6/2016 | Yu | H04N 21/4858 |
| | | | 725/40 |

OTHER PUBLICATIONS

Cloudinary, Fetch remote images, Apr. 12, 2015 (Year: 2015).*
Obaro Ogbo, How to code a simple Android widget, May 22, 2015 (Year: 2015).*
Roger Fingas, "Comparing Apple's 4th-gen Apple TV with the competition", http://appleinsider.com/articles/15/09/19/the-new-apple-tv-vs-the-competition-whats-best-for-streaming-on-your-tv, Sep. 19, 2015.
Dom Esposito, "Apple TV (4th Gen) unboxing + exclusive in-depth hands-on guide [Video]" http://9to5mac.com/2015/09/21/apple-tv-4th-gen-unboxing-exclusive-in-depth-hands-on-guide-video/, Sep. 21, 2015.
Apple.com, "A TV Experience You've Never Experienced", http://www.apple.com/tv/experience/, downloaded from the internet on May 12, 2016.
International Search Report dated Nov. 29, 2016 from International Application No. PCT/KR2016/009535.
Written Opinion dated Nov. 29, 2016 from International Application No. PCT/KR2016/009535.
Extended European Search Report regarding Application No. 16842209.5, dated Oct. 9, 2018, 8 pages.

* cited by examiner

HOME MENU INTERFACE FOR DISPLAYING CONTENT VIEWING OPTIONS

CROSS-REFERENCE TO RELATED APPLICATIONS

This application claims priority under U.S.C. § 119(e) to U.S. Provisional Application No. 62/214,435 filed Sep. 4, 2015, entitled "SYSTEM AND METHOD FOR BROWSING CONTENT ON A MEDIA CONSUMPTION DEVICE THAT PROVIDES DIRECT ACCESS TO CONTENT BY AGGREGATING FROM MULTIPLE CONTENT SOURCES" by Ronen et al., the entirety of which is incorporated herein.

FIELD OF THE INVENTION

The present invention relates to content viewing devices and system menu interfaces on such devices. More specifically, it relates to a user interface for displaying content sources and accessing content.

BACKGROUND

In recent years, the range, volume, and sources of content available for viewing on TV and other content viewing devices has increased significantly. There are now non-traditional sources of content that can be viewed via applications on devices, including streaming and Web content, which has made it more complex and time-consuming for users to select and access content. Not surprisingly, TV viewers, for example, are getting frustrated with the present state of this fragmented content experience. They often find it inefficient or cumbersome to find content that they want to watch and have to switch between different types of content sources. Moreover, they have to do this through a TV system interface that is not uniform in its presentation and does not provide an intuitive, uniform, or pleasant user experience. In addition, not all users are technically savvy enough to switch, for example, between apps, input devices, streaming, and live TV. Users typically have to go through several menu options to find the correct content source, launch or open it, browse available content, and identify the content they want to watch.

What is needed is an integrated approach and presentation with respect to options for selecting content sources or services, and opening specific content from a selected source. These features and entry points into system functions should be presented to the user in one uniform, simple menu.

SUMMARY

In one aspect of the present invention, a method of displaying content viewing options on a content viewing device, such as a television, is described. A first tile display framework, referred to as a launcher, having multiple launcher tiles is rendered on a content viewing device. One group of launcher tiles is dedicated to content sources and each tile in this group represents a content source and displays an image or text representing the source. A launcher tile provides a direct link to a content source, such as an application, a streaming service, a connected input device, or a wirelessly connected source. A second tile display framework, referred to as an accelerator, having multiple accelerator tiles may also be rendered on the content viewing device. An accelerator tile shows content preview, such as a still frame from the content or content summary An accelerator tile also provides a deep link to the content. A user can enable an accelerator link by selecting it which opens the content source. Before the user selects either a launcher or accelerator tile, the content source has not been opened. By opening the content source, for example, an app, the content viewing device accesses or retrieves the content and displays the specific content detail page or a playback screen.

BRIEF DESCRIPTION OF THE DRAWINGS

The invention and the advantages thereof, may best be understood by reference to the following description taken in conjunction with the accompanying drawings in which.

DETAILED DESCRIPTION

Methods and systems for implementing a home menu interface and framework that enable direct access to content sources on a content viewing device are described in the various figures. The home menu interface and the underlying functionality provide playback of content previews and other options to a user in a visually uniform manner and does so without requiring opening or fully executing content source software on the viewing device. The home menu interface of the present invention aggregates content, services, and system functions of the viewing device to a single entry point.

Figure 1:
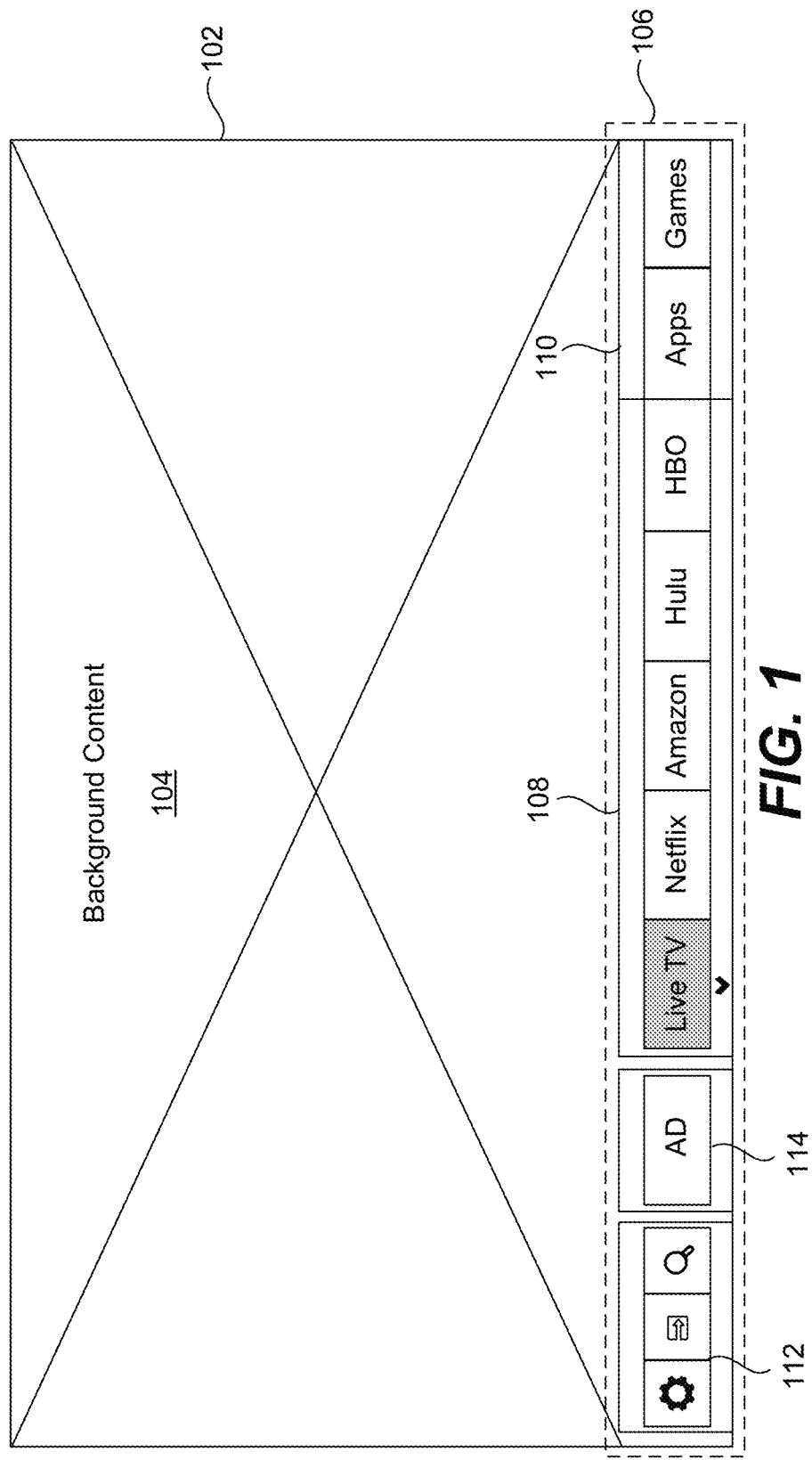
FIG. 1 is a screen shot diagram of a monitor for a content viewing device such as a TV or other large-format viewing means in accordance with one embodiment.
Figure 2:
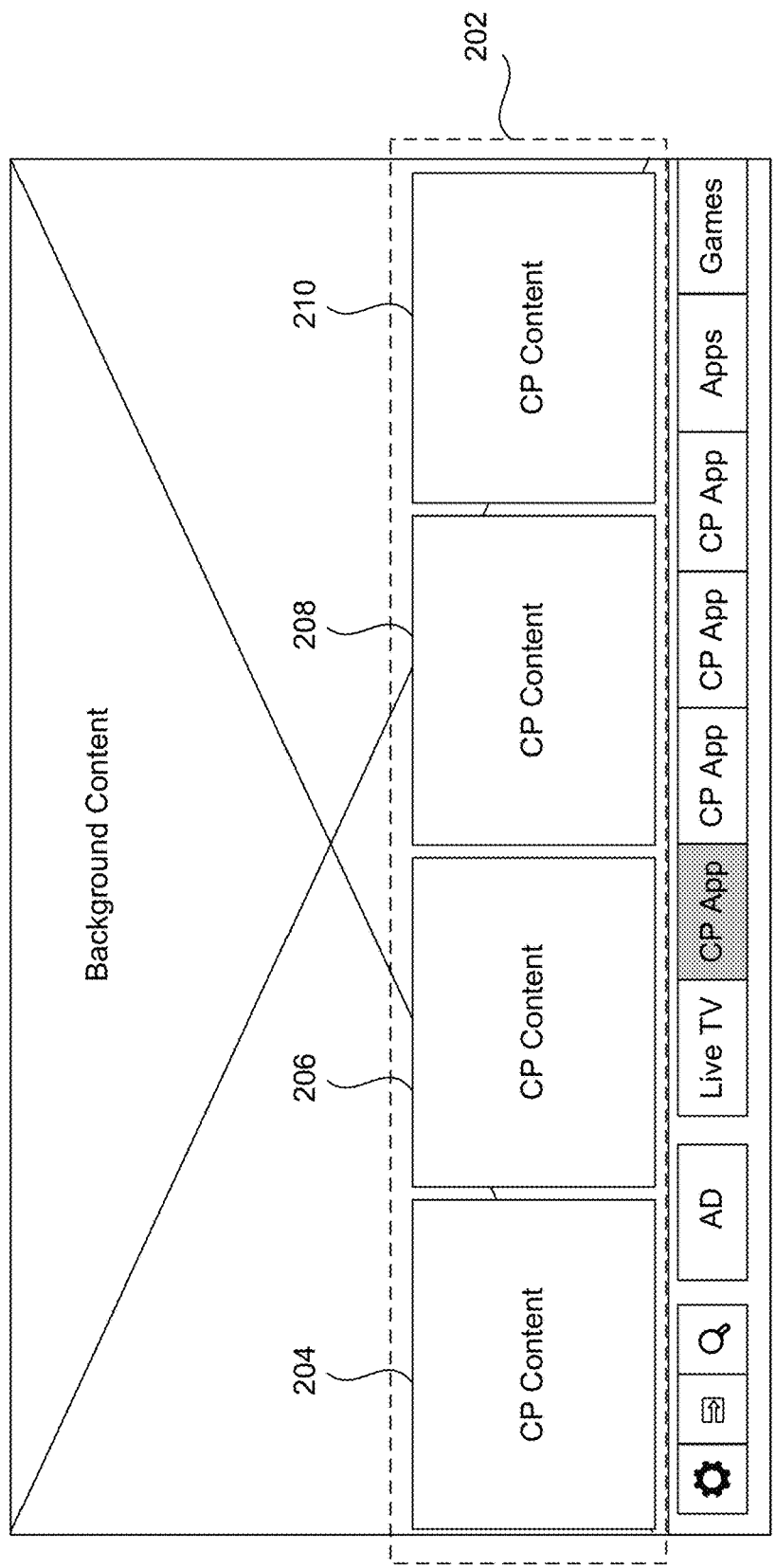
FIG. 2 is a screen shot diagram of a display of a monitor for a TV showing tiles in an accelerator in accordance with one embodiment.
Figure 3:
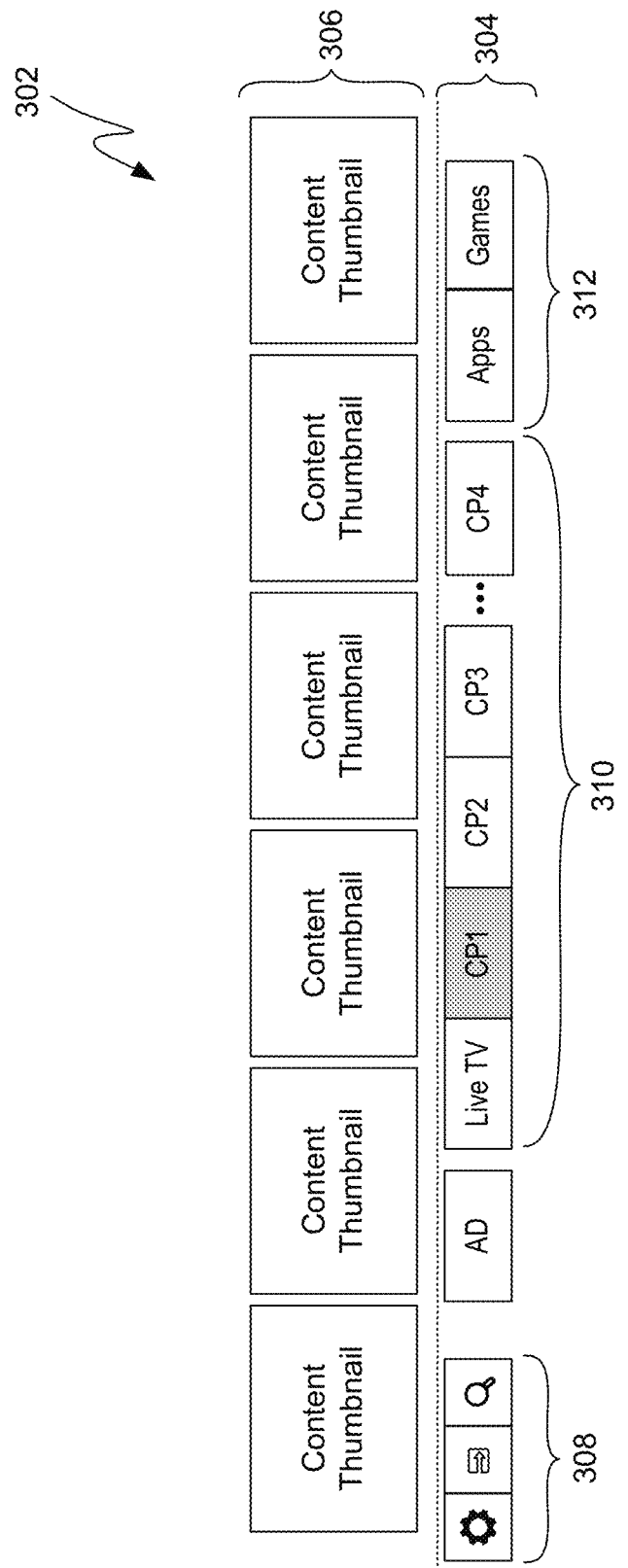
FIG. 3 is a block diagram showing a home menu interface in accordance with one embodiment.

FIGS. 1 and 2 introduce two primary components of the home menu interface of the present invention. FIG. 3 provides more detail on specific elements of these components of the present invention.

FIG. 1 is a screen shot diagram of a monitor for a content viewing device such as a TV or other large-format display. In the described embodiment and for ease of illustration, the content viewing device is a TV, but it should be understood that the home menu interface of the present invention can be implemented on other devices including tablets, remote controls with displays, smart phones, computers, kiosks, and other suitably formatted devices. A screen 102 displays background content 104 when first powered on. This content may be the last content that the user was watching on the TV. The home menu framework overlays background content 104 on screen 102.

In the described embodiment, a row of menu elements referred to as a launcher 106 is at the bottom of screen 102. In other embodiments, launcher 102 may be at the top or along the sides of screen 102. The user interface elements in launcher 106 are referred to as tiles. In one embodiment, the tiles are grouped into three categories described below. Other embodiments of launcher 106 may have more or fewer categories of tiles. In one embodiment, the categories are settings, content sources, and showcase. The tiles in the content source category are of particular relevance to the present invention. These tiles are also referred to as user-configurable tiles. As discussed in more detail below, the content of the launcher tiles is determined by the TV or device manufacturer. It is important to note that by highlighting a launcher tile, specifically the content source tiles, the underlying application or source is not opened. Launcher 106 is displayed when the user powers on the TV and presses a Home Menu button or equivalent on the remote control. In one embodiment, the user sees the home menu upon turning on the TV. The user can navigate through the launcher.

FIG. 2 is a screen shot diagram of a display of a monitor for a TV showing tiles in an accelerator in accordance with one embodiment. Above launcher 106 is a row of tiles referred to as an accelerator 202. The user can highlight a launcher tile using the left and right navigation buttons. An accelerator is specific to a highlighted launcher tile. Not all launcher tiles have an accelerator. The images or information shown in accelerator tiles are determined by the content source, also referred to as content partner or provider, tile highlighted in the launcher. In the described embodiment, the content partner may decide to use the two left-most accelerator tiles 204 and 206 to show images of shows most recently watched, streamed, or accessed by the user. As with the launcher tiles, it is important to note that these images are shown to the user without the content source app being opened. Other tiles in accelerator 202, tiles 208, 210, and 212 may be used to display images or information on other shows that the content partner recommends to the user based on what the user has watched previously. They may also be used to prioritize and promote content. The information shown in accelerator tiles can be movies or TV series recommendations and other information that the content partner believes may be of interest to the user. In the described embodiment, the order of tiles 204-210 is determined by the content partner. The user is able to easily see and assess what is available to watch by simply highlighting the corresponding launcher tile without opening or launching the underlying content source app. In other embodiments, the information shown in the accelerator tiles can be recommendations provided from a server not controlled by the content partner. The content for such recommendations may be determined through automated content recognition analysis performed on the device or by data provided from the device to the server.

FIG. 3 is a block diagram showing a home menu interface in accordance with one embodiment. As described in FIGS. 1 and 2, a menu interface 302 includes two major components: launcher 304 and accelerator 306. Launcher 304 includes multiple launcher tiles. In one embodiment, these tiles are separated into three groups: settings 308, content sources 310, and showcase 312. There may also be one or more tiles dedicated to advertising and are defined by the ad provider, including static images or video. Tiles in settings 308 may not be edited, configured, or deleted by the user. They are used to select conventional TV settings (sound, picture, sleep, etc.), perform searches (of movies, TV shows, channels, apps, people, etc.), and select system sources (live TV, HDMI ports, console, etc.).

As noted, tiles in content sources group 310 are user configurable. These tiles have several characteristics. In one embodiment, a content source tile represents a content partner, that is, a third-party entity that provides content or services, such as NETFLIX, HULU, YOUTUBE, AMAZON, and the like. These entities are partners with the TV manufacturer. One of the tiles is the Live TV tile which represents an entity that provides live TV content, such as a cable TV company, a satellite network, or an antenna. In these cases, the input source may be a set-top box, an antenna, coaxial cable, or satellite dish. More generally, the tiles represent applications for the content partners and the logo or name of the partner is shown in the launcher tile.

In another embodiment, launcher tiles in group 310 can be any app, game or connected device. As noted, apps and games are installed and run on the TV. Connected devices can be any device that is physically or wirelessly connected to the TV, and can include set-top boxes, streaming media devices (e.g., ROKU, CHROMECAST, APPLE TV, etc.), computers(e.g., laptops, PCs), storage devices (e.g., USB stick, hard drives), smart phone or tablets or any other device designed to work with the TV's I/O system.

A launcher tile can be edited if an edit indicator appears on the tile when it is highlighted. When activated, the edit or options indicator displays a sub-menu of contextual options for the tile, such as move or remove. Different options may be displayed depending on the type of tile or object.

A user may change the configuration or order of content source tiles, may add tiles representing other content providers, and may delete tiles. It is customizable by the user to suit his or her viewing habits. If a new content provider appears in the market and has partnered with the TV manufacturer, the user can download the application and add (and position) a tile for the new provider in group 310. In another embodiment, the content provider does not need a partnership with the TV or device manufacturer. It can develop an application, make it available in an accessible app store for download by the user, and the user can include the tile in group 310. The TV manufacturer may open the device API to allow any application developer or other entity to publish content so that the user can make it available in group 310 and show content from the application in group 306.

Selecting or launching a launcher tile, e.g., highlighting the tile and causing its selection through a suitable interaction (e.g., pressing SELECT or ENTER hard button on a remote control, touching a soft button on a touch screen on a tablet or phone, using recognized air gestures, or pointing to the screen) enables the user to switch to a specific input source to provide content or services to the TV, for example, HDMI1 for Live TV or launch a content source app or game. These are referred to as direct links to the apps. The user is taken to the last-used state in the app or game. Or the user may see a login page and may have to go through a login process first. The home menu is not shown at this stage. This can be used to launch an app, such as any app that provides content (movies, TV, videos, etc.), a streaming service, a connected input device, such as a set-top box, game console, antenna, etc., or a wirelessly connected source.

Accelerator 306 includes tiles that are deep links to content selected and prioritized by the content source. This is an opportunity for the content partner to not only facilitate resuming playback for recently watched shows but to display new content or content that the partner wants to promote to the user in a visually uniform and efficient manner; the user does not need to open any apps, flip through screens or pages, or navigate through a hierarchy of menu options. Selecting an accelerator tile launches the underlying app. This is referred to as a deep link to the content. It takes the user down the hierarchy of menu options, allowing the user to bypass these steps and go deep or straight to the previewed content.

In one embodiment, accelerators may also contain "Function Tiles" that may also be characterized as deep links into apps as well as device. The key characteristic is that they link to a function instead of a destination. For example, an accelerator tile for Netflix could have a function tile called "switch user" which would launch the Netflix app and pass it a URL that triggers an event that is equivalent to selecting "switch user" within Netflix. In another example, the accelerator for a set-top box can have function tiles for STB functions such as Home, Guide or Menu. As such, these function tiles are similar to other accelerator tiles, but they are displayed differently to the user. And, as noted, they can deep link to destinations that are not specifically content related.

Showcase tiles 312 are for specific apps and games selected by the TV or device manufacturer or by the user. The showcase tiles cannot be deleted or added to, but can be configured or ordered by the user. Each of these launcher tiles has an accelerator which "showcases" apps or games for the user. The configuration of the apps or games in the accelerator may be similar to the configuration for the content source apps, e.g., the most recently accessed apps or games on the left and recommended ones to the right. Selecting either Apps or Games from the showcase launcher tiles is a direct link to an apps or games page and brings up a full-screen app or game browsing interface (e.g., displaying many apps or games and showing tabs for My App, Most Popular, What's New, etc.). Selecting an accelerator tile from one of the Apps or Games showcase tiles triggers a deep link and launches the app or game corresponding to that tile.

Figure 4:
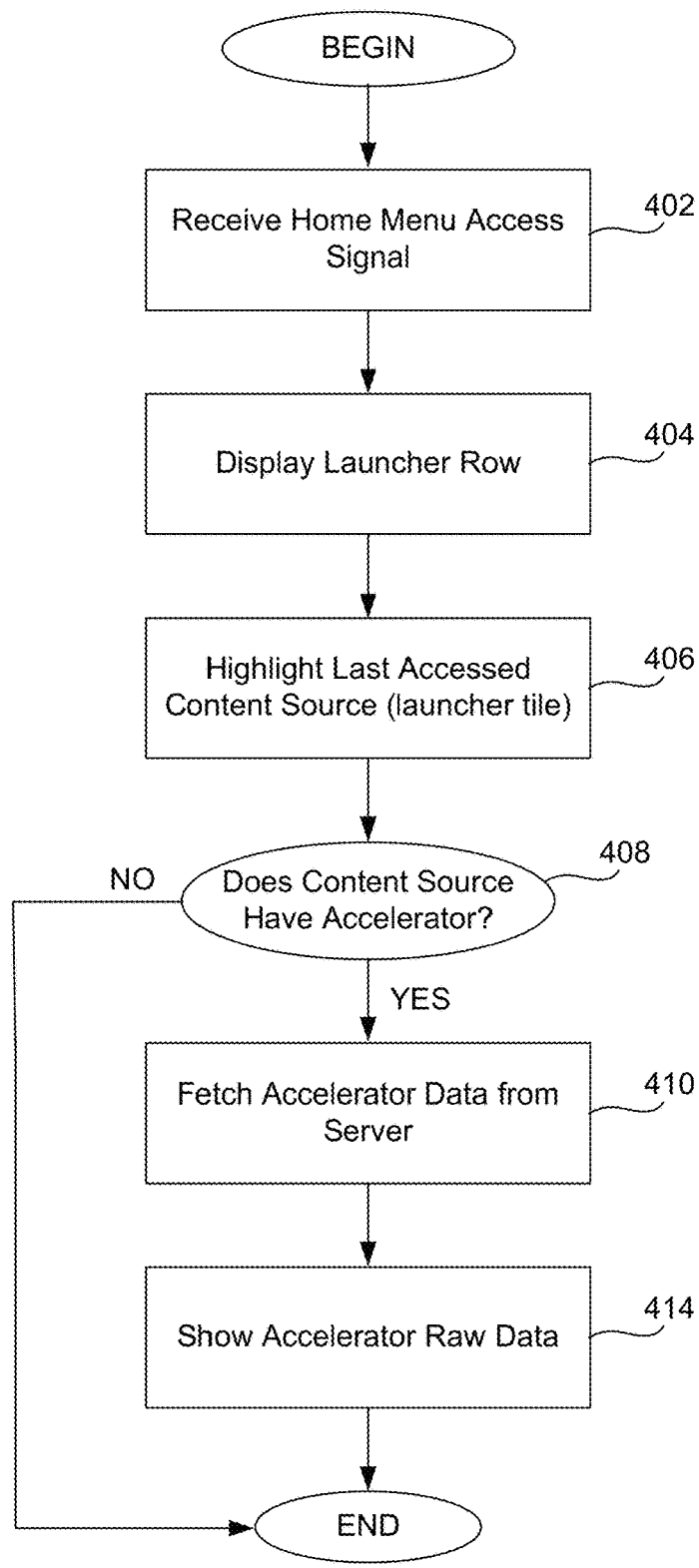
FIG. 4 is a flow diagram of a process of displaying a launcher and an accelerator on a content viewing device in accordance with one embodiment.

FIG. 4 is a flow diagram of a process of displaying a launcher and an accelerator on a content viewing device in accordance with one embodiment. At step 402 the device is powered on and receives an indication to access the home menu (e.g., user presses a Home Menu hard button on the remote control or on the TV, touching a soft button on a touch screen on a tablet or phone, using recognized air gestures, or pointing to the screen). At step 404, the TV begins processing to display a launcher row. The launcher may be overlaid over background content, such as currently playing content, last viewed content, other animated content, static content (e.g., user configured photo, colors, etc.). In another embodiment, the home menu may appear by default when the TV is powered on.

Once the launcher row is displayed, at step 406 the system determines the last-accessed content source on the TV and highlights the associated launcher tile. If a tile cannot be determined, a default tile (e.g., the left-most tile, the settings tile, etc.) is highlighted. Content shown in the launcher tiles are fetched from appropriate sources. For example, if the content source is an app, a call may be made to an app server to see what content (e.g., video images, text, etc.) to render in that specific launcher tile. Launcher tile content, e.g., what is displayed in the tile varies. Setting tiles are determined by the TV or other content viewing device manufacturer. User-configurable tiles may contain content partner logos, trademarks, or other source identifiers, etc.

At step 408 the system determines whether the content source highlighted in the launcher at step 406 has an associated accelerator. If it is determined that there is an accelerator, control goes to step 410 where the system retrieves accelerator data from an appropriate server. In one embodiment, accelerator content could be hosted from multiple servers and in most cases is hosted on content provider servers, but may also be hosted on the TV or device manufacturer's servers. This data determined by the content provider is displayed in the accelerator tiles at step 414. If there is no accelerator for the content source, nothing is displayed above the launcher. At this stage a process of displaying a launcher and accelerator upon powering the TV and accessing the launcher is complete.

Figure 5:
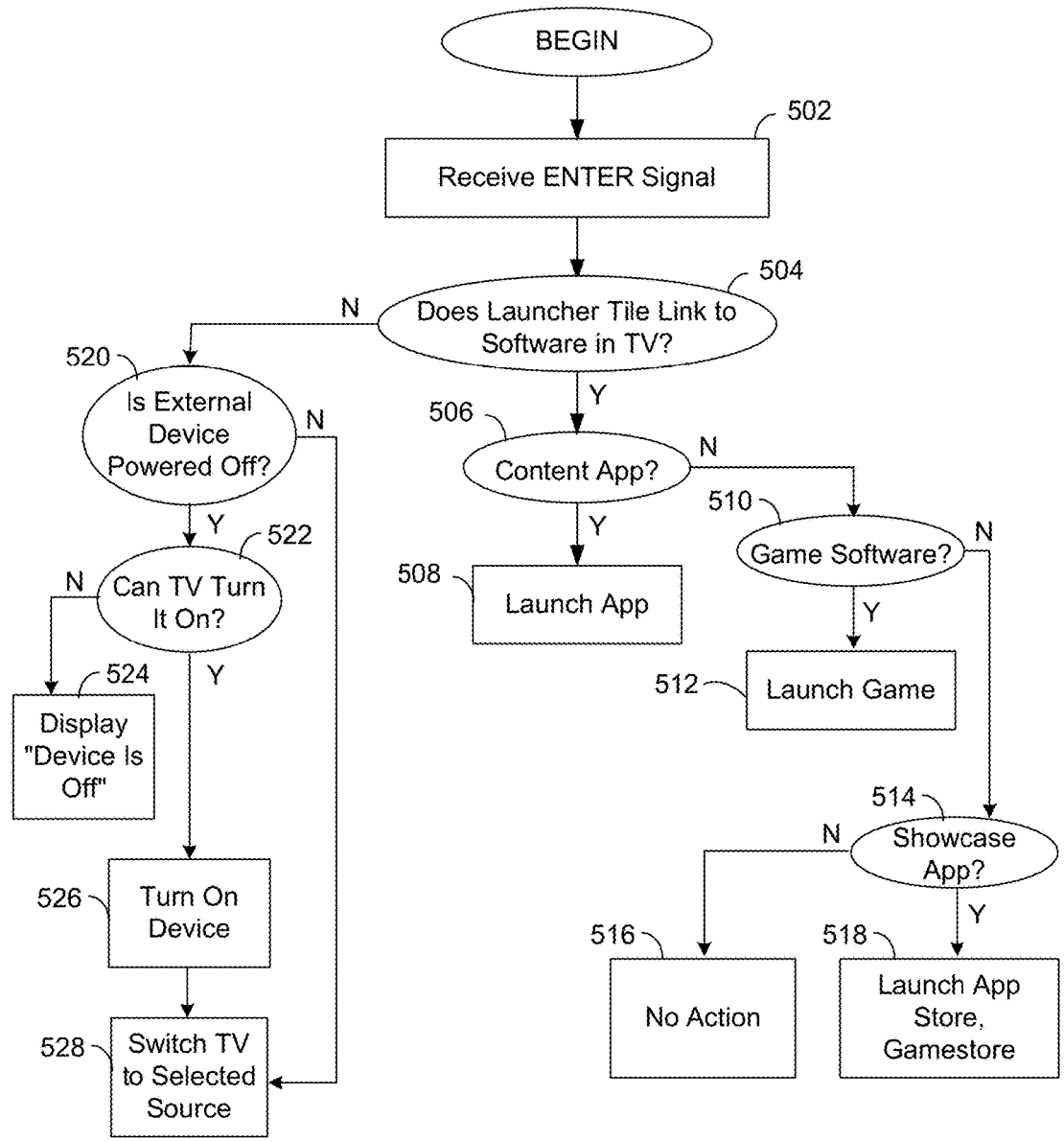
FIG. 5 is a flow diagram of a process of launching content source applications in accordance with one embodiment.

FIG. 5 is a flow diagram of a process of launching content source applications in accordance with one embodiment. As discussed above in step 406 of FIG. 4, the system may highlight the last-accessed content source launcher tile. The user can navigate left or right to shift the focus to other launcher tiles. The user can then select the desired content source, effectively switching between content sources, and send a signal to the system as shown in step 502.

At step 504 the system determines whether the launcher tile that was in focus or highlighted when the signal was received links to internal software. If the link is to software residing in TV or device memory, control goes to step 506 where the system continues its logical decision-making process. It determines whether the software being linked to is a content source application. If it is, the application is launched at step 508. If it is not, control goes to step 510 where the system determines whether the software is a game program. If it is, control goes to step 512 where the game is launched. If it is not game software, control goes to step 514 where the system determines if the software is a showcase application, as described above. If it is showcase application software, the TV manufacturer app store or game store, depending on which tile is selected, is launched as shown in step 518. If the launcher tile does not link to any of these internal software components, the system executes TV system software at step 516 and the full screen experience shows options for TV settings and search.

Returning to step 504, if the system determines that the launcher tile does not link to internal software but rather to an external device, control goes to step 520. Here the system first checks if the external device is powered off? If it is powered off, control goes to step 522 where it is determined whether the TV can turn the external device on. If it cannot, the TV displays a message to the user (e.g., Device is Of at step 524. If the TV can power on the device, control goes to step 526 where the TV powers on the device and at step 528, the system switches to the selected source. The system goes straight to switching to the source from step 520 if it is determined that the external device is powered on.

Returning to FIG. 4, at step 414 the system has rendered an accelerator row for a corresponding launcher tile. The user may manipulate the highlighting or selection and begin navigating accelerator tiles, each one showing content for the corresponding content source launcher tile such as resume playback, displaying a detail page, episode listing, and the like.

Figure 6:
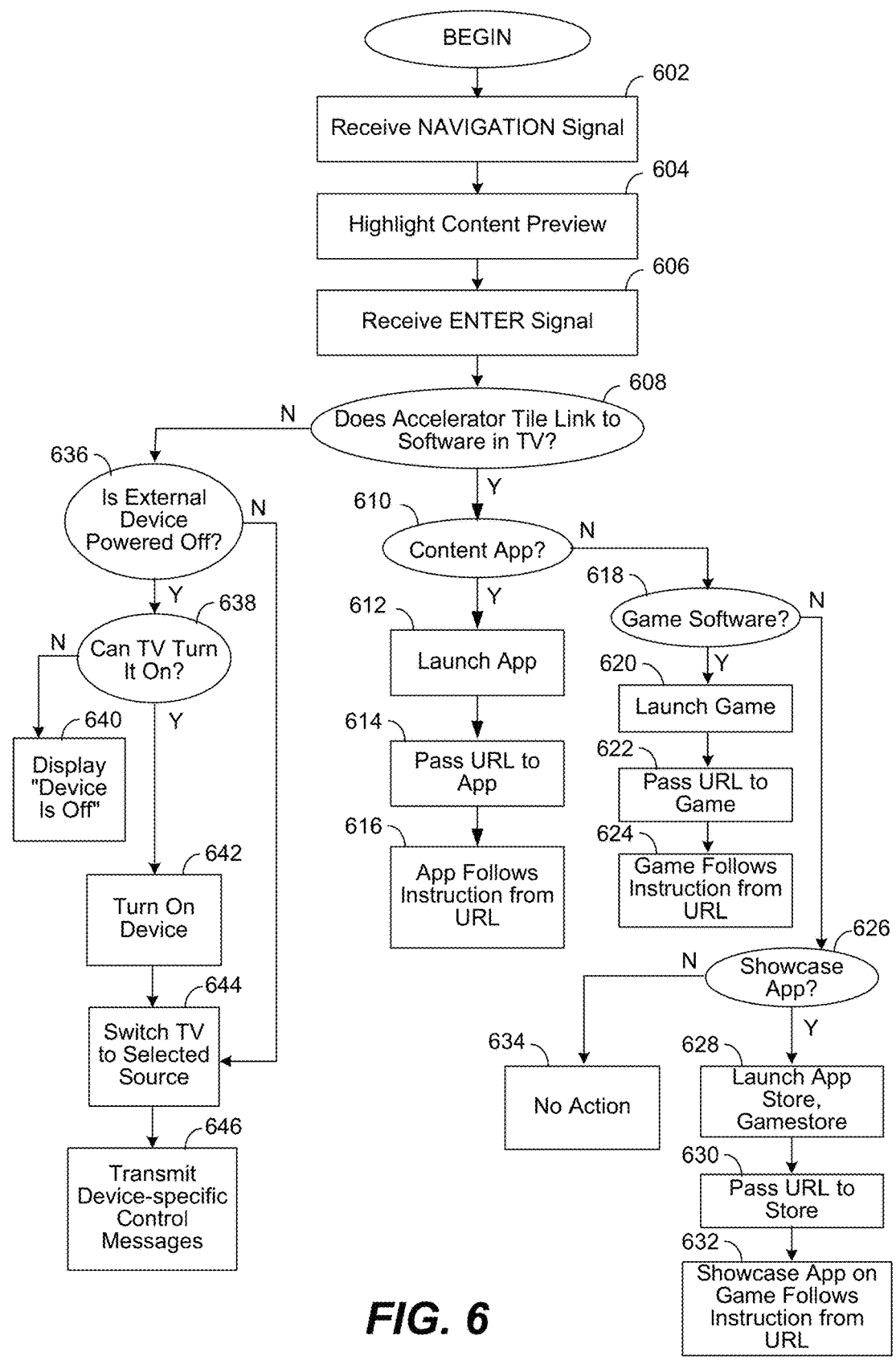
FIG. 6 is flow diagram showing a process of playing content when an accelerator tile is enabled.

FIG. 6 is flow diagram showing a process of playing content when an accelerator tile is enabled. At step 602 the system receives a navigation signal indicating that the cursor has moved to the accelerator row from the launcher. At step 604 an accelerator tile is highlighted. The tile highlighted may be a default selection (e.g., the left-most tile in the row, the tile displaying content most recently accessed, etc.). In the described embodiment, the content partner controls the order of the tiles in the accelerator. Optionally, a server or the device may control the order of the tiles displayed in the accelerator. One way to describe an accelerator tile is as a content media "thumbnail" but the functionality of the tile is broader. Tiles may be separated into various categories (e.g., recent content, recommended content, etc.). For example, the left-most two tiles may show two most recently watched shows or games played and give the user an easy way to resume watching or playing. The other tiles may be content recommendations and display details of recommended shows. Selecting one of these will launch the content source app and playback will begin. Optionally, prior to playback, login credentials may be requested depending on the content source. Such credentials may be saved and automatically provided or submitted by the user in response to a login request.

As described above, accelerator tiles may be referred to as deep-link tiles in that selecting one launches the app and starts playback from the content source, allowing the user to bypass intermediate menu options. Once the user has navigated to the desired accelerator tile and selects it, at step 606 the system receives an ENTER signal.

At step 608 the system begins a sequence of steps similar to those taken in FIG. 5 for the launcher. The process begins with the system determining whether the accelerator tile that was selected links to software stored in the TV or content viewing device. It the software is internal to the device, control goes to step 610. At step 610 the system determines whether the software being linked to is a content source application. If it is, the application is launched at step 612. Once the application is launched, the URL or link associated with the specific accelerator tile that is highlighted is passed to the corresponding application. The app follows the instructions from the URL which results in the application obtaining content from external servers (typically operated by the content provider) and displaying it on the TV as a full-screen experience.

If the system determines that it is not a content source application, control goes to step 618 where the system determines whether the software is a game program. If it is, control goes to step 620 where the game application is launched. The URL associated with the accelerator tile is passed to the game program. The game program follows the instructions from the URL which results in obtaining additional game program content from the game provider server. If it is not game software, control goes to step 626 where the system determines if the software is a showcase application. If it is showcase application software, the TV manufacturer app store or game store, depending on which tile is selected, is launched as shown in step 628. As with the content and game accelerator tiles, the URL for the specific accelerator tile is passed to the app or game store software at step 630. At step 632 the showcase app or game follows the instructions from the URL. If the accelerator tile does not link to any of these internal software components, the system executes TV system software at step 634 and the full screen experience shows options for TV settings and search.

Returning to step 608, if the system determines that the accelerator tile does not link to software in the TV, control goes to step 636 where the system checks a corresponding external device. Here the system first checks if the external device is powered off. If it is powered off, control goes to step 640 where it is determined whether the TV can turn the power on for the external device. If the TV is not able to turn the power on for the device, the TV displays a message on the screen to the user (e.g., "External Device is Off") at step 524. If the TV can power on the device, control goes to step 642 where the TV powers on the device and at step 644, the TV switches to the selected input source. The system goes straight to switching to the input source from step 636 if it is determined that the external device is powered on. At step 646 the TV transmits device-specific control messages to the external device.

As described above, the user-configurable launcher tiles provide what are referred to as direct links to content sources. The user can navigate from tile to tile and can highlight a tile or put a tile "in focus." When a launcher tile is in focus, the user can select it thereby launching the underlying content source app operated by a content provider. When a launcher tile is in focus, an accelerator may be triggered and appear above the launcher as a secondary bar of tiles. A launcher tile may not have an associated accelerator.

In one embodiment, selecting a content source app from the launcher opens or launches the app. Depending on security requirements, the user may be taken to a sign-in page for the app and enter login credentials. Similarly, selecting an accelerator tile for the content source may also first lead to a sign-in page for the user before there is playback of any content on the device. In some cases, the app may not require a new sign-in from the user when the user is resuming playback of a "Recently Watched" or "Recently Streamed" show or video. In another scenario, the user may be directed to a free trial sign-in page if the user is not already a subscriber. In one embodiment, selecting an accelerator tile that provides a details page of a show (and not playback of specific content) may not necessarily open the content source app. Once the details page appears, for example, listing episodes of a show, and the user selects an episodes (i.e., indicating ENTER or RETURN on an episode or other content that can be played), the app will launch and the episode will begin playing.

If the user selects a user-configurable tile in the launcher, the corresponding app launches and the screen display content, such as a login screen, free trial page or last-used content. The launcher and accelerator are no longer shown. If the user does not select a launcher tile, the cursor can be directed up to the accelerator tiles. As noted, the content or image shown in an accelerator tile can be determined by the content partner. The content partner may also decide on the order of the tiles in the accelerator. The tiles on the left may show the most recently viewed or accessed content by the user. Other tiles in the accelerator may display information on recommended content (based on what the user has watched) for the user as determined by the content partner. In the case of games, a tile can show Resume Playing the last game, Most Recent Games and Recommended Games.

When the user navigates through the accelerator tiles, it is important to note that the content source app has not yet been opened but the user is still able to see preview images and information of the content in the home menu interface. If a user selects an accelerator tile to resume or begin new playback, the app opens, content is retrieved and content begins playing. If a tile for recommended content is selected, the app opens and a detail page for the content is retrieved and displayed on the screen.

In one embodiment, the home menu interface can be used to switch between apps on the TV or other content viewing device, enabling what may be referred to as multitasking. The interface can also be shown on devices connected to the TV, such as tablets, mobile phones, computers, remote controls with a display, among other devices. The home menu interface is mapped to a button on the remote control. Once at the home menu screen, the user can easily switch between different apps and other content sources. In other embodiments, there may be alternative options to access the home menu interface, such as a soft button on a touch screen, an overlay initiated up by a gesture, etc.

In one embodiment, the system enables content access history tracking. This data can be utilized to generate personalized content recommendation across different content sources and can be shared with these sources to improve accuracy in their own content recommendation.

In this manner the user can essentially jump from a high level to the lowest level. At the high level, the user has not opened any apps or switched to any input sources but is still able to browse available content. At the lowest level or root, only after selecting the desired content, does the system software go through the more resource and time intensive step of opening the app. All the steps between the high level (shown as the home menu) conventionally required to navigate a hierarchy of options to reach the desired content are bypassed. In the accelerator, the content partner is able to publish or show deep links to its experiences and content so that users can go anywhere in its app.

Figure 7:
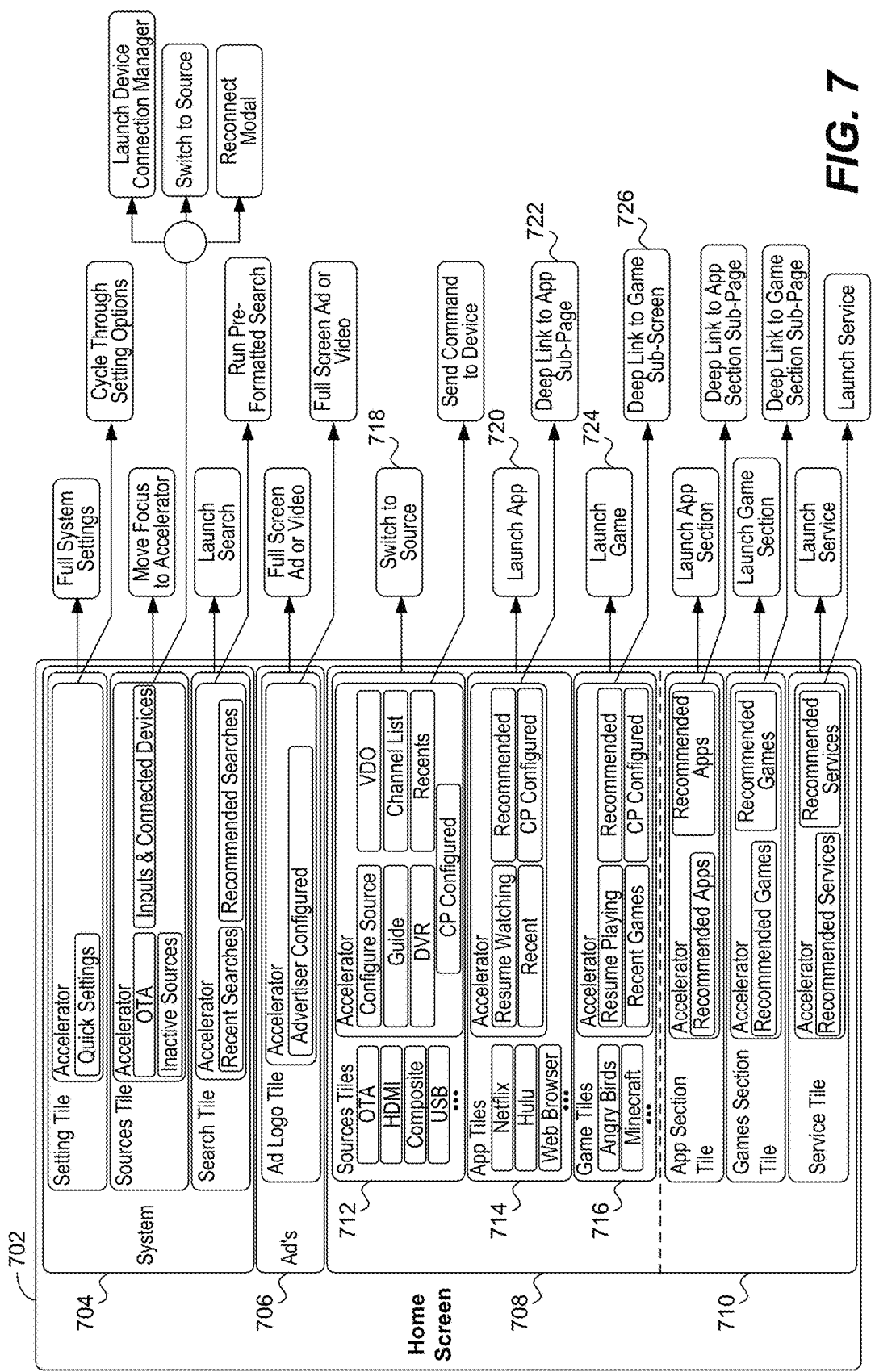
FIG. 7 is a system diagram showing a conceptual view of the home menu platform in accordance with one embodiment.

FIG. 7 is a system diagram showing a conceptual view of the home menu interface platform in accordance with one embodiment. A home menu screen framework 702 includes numerous components. Framework module 704 includes the system tiles of the launcher module 706 represents one or more ad tiles. Framework module 708 includes input sources tiles 712, content app tiles 714, and game tiles 716. Framework module 710 includes the showcase tiles (app section tiles, games section tiles, and service tiles).

The framework modules lead to other screens, cause specific operations, or launch services, as indicated in the boxes in FIG. 7. The modules of particular relevance to the present invention are elaborated on further here. Framework module for source tiles 712 enables switching sources at the launcher as indicated in box 718. After a source tile has been selected in the launcher, a specific device or service can be selected and a command is sent to the device or service. Framework module 714 includes the content provider apps. Selecting an app in the launcher opens the app as shown in box 720. If the content app is highlighted, accelerator tiles for that app are shown. If one of those are selected, there is a deep link to the content provider app sub-page as shown in box 722. Framework module 716 can lead to launching a game as shown in box 724 or if selected from the accelerator to a deep link to a game sub-screen as shown in box 726.

Figure 8:
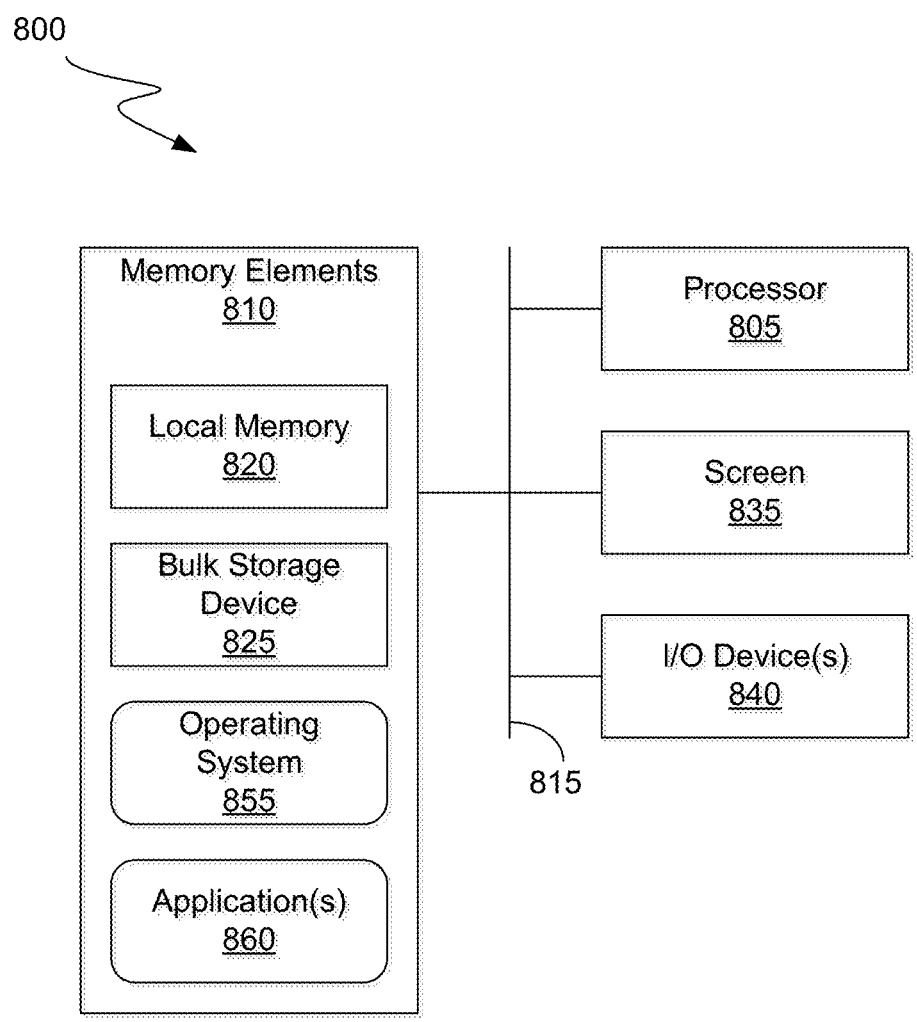
FIG. 8 is a block diagram showing components of a content viewing device in accordance with one embodiment.

FIG. 8 is a block diagram of a data processing system 800 in accordance with one embodiment. System 800 may be used to implement any of a variety of systems and/or computing devices that include a processor and memory and that are capable of performing the operations described within this disclosure. In one embodiment, it can be used to implement the conceptual framework of a home menu interface as described in FIG. 7 on a content viewing device. It can also be used to execute computer instructions to implement the logic flowcharts in FIGS. 4, 5 and 6. The device may be any device described in connection with FIGS. 1-7. The device may also be a remote control device for operating a TV. In various examples described herein, system 800 is a content viewing device, such as a TV.

As pictured, system 800 includes at least one processor 805 coupled to memory elements 810 through a system bus 815 or other suitable circuitry such as an input/output (I/O) subsystem. System 800 stores program code within memory elements 810. Processor 805 executes the program code accessed from memory elements 810 via system bus 815. Memory elements 810 include one or more physical memory devices such as, for example, a local memory 820 and one or more bulk storage devices 825. Local memory 820 refers to random access memory (RAM) or other non-persistent memory device(s) generally used during actual execution of the program code. Bulk storage device 825 may be implemented as a hard disk drive (HDD), solid state drive (SSD), or other persistent data storage device. System 800 may also include one or more cache memories (not shown) that provide temporary storage of at least some program code in order to reduce the number of times program code must be retrieved from bulk storage device 825 during execution.

System 800 may be coupled to one or more I/O devices such as a screen 835 and one or more additional I/O device(s) 840. The I/O devices described herein may be coupled to system 800 either directly or through intervening I/O controllers. In one aspect, screen 835 may be implemented as a display device that is not touch sensitive, such as a TV display. In another aspect, screen 835 may be implemented as a display device that is touch sensitive.

Examples of I/O device(s) 840 may include, but are not limited to, a universal remote control device, a keyboard, a mobile device, a pointing device, a controller, a camera, a speaker, and a microphone. In some cases, one or more of the I/O device(s) may be combined as in the case where a touch sensitive display device (e.g., a touchscreen) is used as screen 835. In that case, screen 835 may also implement a keyboard and a pointing device. Other examples of I/O devices 840 may include sensors. Exemplary sensors may include, but are not limited to, an accelerometer, a light sensor, touch screen sensors, one or more biometric sensors, a gyroscope, a compass, or the like.

I/O devices 840 may also include one or more network adapter(s). A network adapter is a communication circuit configured to establish wired and/or wireless communication links with other devices. The communication links may be established over a network or as peer-to-peer communication links. Accordingly, network adapters enable system 800 to become coupled to other systems, computer systems, remote printers, and/or remote storage devices, such as remote servers storing content. Examples of network adapter(s) may include, but are not limited to, modems, cable modems, Ethernet cards, wireless transceivers, whether short and/or long range wireless transceivers (e.g., cellular transceivers, 802.11x (Wi-Fi™) compatible transceivers, Bluetooth® compatible transceivers, and the like).

As pictured in FIG. 8, memory elements 810 may store an operating system 855 and one or more application(s) 860, such as content source applications, game applications, or showcase applications. In one aspect, operating system 855 and application(s) 860, being implemented in the form of executable program code, are executed by system 800 and, more particularly, by processor 805. As such, operating system 855 and application(s) 860 may be considered an integrated part of system 800. Operating system 855, application(s) 860, and any data items used, generated, and/or operated upon by system 800 are functional data structures that impart functionality when employed as part of system 800.

As noted, in one aspect, system 800 may be used to implement a TV. In another aspect, system 800 may be used to implement a computer, such as a personal computer, a server, or the like. In another aspect, system 800 may be used to implement a mobile computing device. Examples of mobile computing devices may include, but are not limited to, "smart" phone, a tablet computer, a mobile media device, and a game console, a mobile internet device (MID), a personal digital assistant, a laptop computer, a mobile appliance device, or the like.

System 800 may include fewer components than shown or additional components not illustrated in FIG. 8 depending upon the particular type of device that is implemented. In addition, the particular operating system and/or application(s) included may also vary according to device type as may the types of network adapter(s) included. Further, one or more of the illustrative components may be incorporated into, or otherwise form a portion of, another component. For example, a processor may include at least some memory.

Various embodiments described herein involve distinct features. It should be appreciated that any feature or functionality from one figure or embodiment may be incorporated into any other figure or embodiment.

Although only a few embodiments of the invention have been described in detail, it should be appreciated that the invention may be implemented in many other forms without departing from the spirit or scope of the invention. For example, the present application and figures describe various methods that enable a home menu interface and underlying functionality for a content viewing device. It should be appreciated that in some embodiments, one or more of the steps in the methods may be modified, reordered and/or deleted. Therefore, the present embodiments should be considered illustrative and not restrictive and the invention is not to be limited to the details given herein.

What is claimed is:

1. A method of displaying content viewing options on a content viewing device, the method comprising:
   rendering a first tile display interface including a plurality of first tiles, each first tile representing a content source that provides content and providing a direct link to a content source application;
   rendering a second tile display interface including a plurality of second tiles in response to receiving a first signal indicating selection of a first tile, each second tile displaying a preview of the content from the content source of the selected first tile and providing a deep link within the content source application to said content;
   displaying the preview of the content from the content source via said each second tile on said content viewing device without executing said content source application;
   receiving a second signal indicating selection of one of the second tiles;
   switching the content viewing device to an input source corresponding to an external device in response to a determination that the selected second tile does not link to software internal to the content viewing device and a determination that the external device is powered on; and
   playing back the content on said content viewing device via execution of the content source application and the external device.

2. The method as recited in claim 1, further comprising:
   highlighting a last-accessed content source tile from the first tile display interface; and
   determining whether a first tile representing a content source has a corresponding second tile display interface.

3. The method as recited in claim 2, further comprising: retrieving second tile display interface data.

4. The method as recited in claim 1, further comprising:
   highlighting a pre-determined content tile displaying a preview of the content without launching the content source application.

5. The method as recited in claim 1, further comprising:
   rendering a source input tile in the first tile display interface;
   rendering a settings tile in the first tile display interface; and
   rendering a showcase tile in the first tile display interface.

6. The method as recited in claim 1, further comprising:
   receiving a first user input signal to move focus from the first tile display interface to the second tile display interface.

7. A content viewing device comprising:
   a display;
   at least one processor coupled to the display; and
   at least one memory component including a computer-readable storage medium arranged to store instructions wherein the instructions, when executed by the at least one processor, causes the content viewing device to:
      render, by the display, a first tile display interface including a plurality of first tiles, each first tile representing a content source that provides content and providing a direct link to a content source application,
      render a second tile display interface including a plurality of second tiles in response to receiving a first signal indicating selection of a first tile, each second tile displaying a preview of the content from the content source of the selected first tile and providing a deep link within the content source application to said content,
      display the preview of the content from the content source via said each second tile on said content viewing device without executing said content source application,
      receive a second signal indicating selection of one of the second tiles,
      switch the content viewing device to an input source corresponding to an external device in response to a determination that the selected second tile does not link to software internal to the content viewing device and a determination that the external device is powered on, and
      play back the content on said content viewing device via execution of the content source application and the external device.

8. The content viewing device as recited in claim 7, wherein the instructions, when executed by the at least one processor, further causes the device to:
   highlight a last-accessed content source tile from the first tile display interface; and
   determine whether a first tile representing a content source has a corresponding second tile display interface.

9. The content viewing device as recited in claim 7, wherein the instructions, when executed by the at least one processor, further causes the device to:
   highlight a pre-determined content tile displaying a preview of the content without launching the content source application.

10. The content viewing device as recited in claim 7, wherein the instructions, when executed by the at least one processor, further causes the device to:
    render a source input tile in the first tile display interface;
    render a settings tile in the first tile display interface; and
    render a showcase tile in the first tile display interface.

11. The content viewing device as recited in claim 7, wherein the instructions, when executed by the at least one processor, further causes the device to:

receive a first user input signal to move focus from the first tile display interface to the second tile display interface.

12. The content viewing device as recited in claim 7, wherein a device manufacturer determines the content source apps displayed in a content source tile group.

13. The content viewing device as recited in claim 7, wherein a content partner determines the content displayed in the second tile display interface.

14. A non-transitory computer readable storage medium containing data stored therein representing software executable by a computer, the software including instructions to display content viewing options on a content viewing device, the storage medium comprising:

instructions for rendering a first tile display interface including a plurality of first tiles, each first tile representing a content source that provides content and providing a direct link to a content source application;

instructions for rendering a second tile display interface including a plurality of second tiles in response to receiving a first signal indicating selection of a first tile, each second tile displaying a preview of the content from the content source of the selected first tile and providing a deep link within the content source application to said content;

instructions for displaying the preview of the content from the content source via said each second tile on said content viewing device without executing said content source application;

instructions for receiving a second signal indicating selection of one of the second tiles:

instructions for switching the content viewing device to an input source corresponding to an external device in response to a determination that the selected second tile does not link to software internal to the content viewing device and a determination that the external device is powered on; and instructions for playing back the content on said content viewing device via execution of the content source application and the external device.

15. The non-transitory computer readable storage medium as recited in claim 14, further comprising:

instructions for rendering a source input tile in the first tile display interface;

instructions for rendering a settings tile in the first tile display interface; and instructions for rendering a showcase tile in the first tile display interface.

16. The non-transitory computer readable storage medium as recited in claim 14, further comprising:

instructions for highlighting a pre-determined content tile displaying a preview of the content without launching the content source application.

\* \* \* \* \*